(12) United States Patent
Zhou et al.

(10) Patent No.: US 10,467,759 B2
(45) Date of Patent: Nov. 5, 2019

(54) INTELLIGENT CONTOURING OF ANATOMY WITH STRUCTURED USER CLICK POINTS

(71) Applicant: Siemens Healthcare GmbH, Erlangen (DE)

(72) Inventors: Shaohua Kevin Zhou, Plainsboro, NJ (US); Daguang Xu, Princeton, NJ (US); Jan Kretschmer, Nürnberg (DE); Han Xiao, Natick, MA (US)

(73) Assignee: Siemens Healthcare GmbH, Erlangen (DE)

( * ) Notice: Subject to any disclaimer, the term of this patent is extended or adjusted under 35 U.S.C. 154(b) by 35 days.

(21) Appl. No.: 15/661,429

(22) Filed: Jul. 27, 2017

(65) Prior Publication Data
US 2019/0035084 A1    Jan. 31, 2019

(51) Int. Cl.
*G06T 7/12*    (2017.01)
*G06T 7/13*    (2017.01)
*G06T 7/00*    (2017.01)

(52) U.S. Cl.
CPC .............. *G06T 7/12* (2017.01); *G06T 7/0012* (2013.01); *G06T 7/13* (2017.01); *G06T 2207/20092* (2013.01); *G06T 2207/30008* (2013.01)

(58) Field of Classification Search
None
See application file for complete search history.

(56) References Cited

U.S. PATENT DOCUMENTS

| | | |
|---|---|---|
| 2015/0317790 A1 | 11/2015 | Choi et al. |
| 2016/0093110 A1 | 3/2016 | Waschbusch et al. |
| 2016/0328855 A1* | 11/2016 | Lay .......................... G06T 5/005 |
| 2017/0039725 A1 | 2/2017 | Dror et al. |
| 2018/0259608 A1* | 9/2018 | Golden .............. G01R 33/5608 |

FOREIGN PATENT DOCUMENTS

WO    WO2012035463 A1    3/2012

OTHER PUBLICATIONS

Ijiri, Takashi et al.: "Bilateral Hermite Radial Basis Functions for Contour-based Volume Segmentation", in: Computer Graphics Forum, vol. 32, No. 2, Blackwell Publishing Ltd, 2013.
Extended European Search Report (EESR) dated Jan. 8, 2019 in corresponding EP Application No. 18184887.0.

* cited by examiner

Primary Examiner — Delomia L Gilliard

(57) ABSTRACT

A computer-implemented method for generating contours of anatomy based on user click points includes a computer displaying an image comprising an anatomical structure and receiving a first user selection of a first click point at a first position on an outward facing edge of the anatomical structure. The computer applies a contour inference algorithm to generate an inferred contour around the outward facing edge based on the first position. Following generation of the inferred contour, the computer receives a second user selection of a second click point at a second position on the image. Then, the computer creates a visual indicator on a segment of the inferred contour between the first position and the second position as indicative of the user's confirmation of accuracy of the segment.

14 Claims, 21 Drawing Sheets

Manual clicking (19 click points)

Contour Inference (1 click point)

Original Image

Original Image

Contour Inference (24 click points)

Manual Clicking (43 click points)

Original Image

Contour Inference (12 click points)

Manual clicking (21 click points)

INTELLIGENT CONTOURING OF ANATOMY WITH STRUCTURED USER CLICK POINTS

TECHNICAL FIELD

The present disclosure relates generally to methods, systems, and apparatuses for generating contours around anatomical structures using click points provided by a user. The techniques described herein may be applied, for example, to studies of various anatomical organs.

BACKGROUND

During the analysis of medical images, it is often important to segment a particular organ or other anatomical structure from the rest of the image. One way of performing this segmentation is by generating a contour around the anatomical structure. The term "contour," as used herein refers to an outline representing or bounding the shape or form of the anatomical object. Conventional techniques exist for performing contouring of images in a manual or intelligent manner.

Manual contouring tools include painting, freehand curve drawing, click-point based polygon drawing, nudge tool, etc., all depending on different user inputs. Manual contouring tools allow a user to generate precise contouring around objects. However, it is often tedious and time-consuming to use manual tool for precise contouring. For example, conventional click-point based contouring techniques often require the user to make many click points around the anatomical structure to ensure that the contour is properly defined.

Intelligent contouring (or intelligent editing) tries to overcome the limitation of manual contouring by invoking intelligent computer algorithms that utilizes the image information to infer the contour. User inputs are provided to guide such an inference in the hope that the final contouring with limited number of user inputs converges to the target. However, sometime even with a large number of user inputs, the intelligent editing fails to converge, thereby leading to editing inefficiency. Examples of intelligent contouring algorithms include intelligent scissor, livewire, smart brush, random walk, and interactive graph cuts.

SUMMARY

Embodiments of the present invention address and overcome one or more of the above shortcomings and drawbacks by providing methods, systems, and apparatuses related to a technique for intelligent contouring of anatomy with structured user click points. The use of structured click points guarantee a convergence behavior with efficiency.

According to some embodiments, a computer-implemented method for generating contours of anatomy based on user click points includes a computer displaying an image comprising an anatomical structure and receiving a first user selection of a first click point at a first position on an outward facing edge of the anatomical structure. The computer applies a contour inference algorithm to generate an inferred contour around the outward facing edge based on the first position. Following generation of the inferred contour, the computer receives a second user selection of a second click point at a second position on the image. Then, the computer creates a visual indicator on a segment of the inferred contour between the first position and the second position as indicative of the user's confirmation of accuracy of the segment. Additionally, the computer may update the inferred contour using the contour inference algorithm with a constraint requiring the segment to remain unmodified.

In some embodiments of the aforementioned method, the first user selection is provided by a user depressing a button of an input device of the computer and the inferred contour is generated while the button is depressed by the user. While the button is depressed by the user, the computer may detect movement of the first click point from the first position by the user and updating the inferred contour around the outward facing edge based on an updated position of the first click point. Similarly, in some embodiments of the aforementioned method, the second user selection is provided by a user depressing a button of an input device of the computer and the visual indicator is generated after the button is released by the user.

Following creation of the visual indicator in the aforementioned method, the computer may receive one or more additional user selections of one or more additional click points at one or more additional positions on the image. Then, the computer may update the visual indicator to cover a new segment of the inferred contour comprising the first position, the second position, and the one or more additional positions as indicative of the user's confirmation of accuracy of the new segment.

In some embodiments, the method further includes the computer determining that the second position is not on the inferred contour and providing a visual alert to the user that the second position is not on the inferred contour. For example, as noted above, the second user selection may be provided by a user depressing a button of an input device of the computer. While the button is depressed by the user, the computer may detect movement of the second click point from the second position by the user to an updated position and determine that the updated position is on the inferred contour. At this point, the computer can update the visual indicator to cover the segment of the inferred contour between the first position and the updated position.

According to another aspect of the present invention, in some embodiments, a second computer-implemented method for generating contours of anatomy based on user click points includes the computer displaying an image comprising an anatomical structure and receiving a first user selection of a first click point at a first position on an outward facing edge of the anatomical structure. The computer applies a contour inference algorithm to generate an inferred contour around the outward facing edge based on the first position and identifies one or more leakages in the inferred contour. The computer receives additional user selections of additional click points at positions corresponding to the one or more leakages. Then, the computer creates visual indicators on segments of the inferred contour defined based on the additional click points. In some embodiments of the method, the one or more leakages in the inferred contour are identified using a machine learning model trained using (a) a plurality of previously generated images of the anatomical structure and (b) a plurality of inferred contours generated by applying the contour inference algorithm to the plurality of previously generated images.

According to other embodiments of the present invention, an article of manufacture for generating contours of anatomy based on user click points comprises a non-transitory, tangible computer-readable medium holding computer-executable instructions for performing a method that includes generating a graphical user interface (GUI) displaying an image comprising an anatomical structure and receiving a first user selection of a first click point at a first position on an outward facing edge of the anatomical structure. The method further includes applying a contour inference algorithm to generate an inferred contour around the outward facing edge based on the first position and, following generation of the inferred contour, receiving a second user selection of a second click point at a second position on the image. A visual indicator is created in the GUI on a segment of the inferred contour between the first position and the second position as indicative of the user's confirmation of accuracy of the segment.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

Embodiments of the present invention address and overcome one or more of the above shortcomings and drawbacks, by providing methods, systems, and apparatuses related to techniques for intelligent contouring of anatomy with structured user click points. The techniques described herein use a contour inference algorithm with constraints based on user-supplied click points. Contour inference algorithms generate contours around anatomical objects based on user-supplied click points and features in the underlying image. However, the contour generated around the object constantly changes as click points are added. As a result, segments of the contour that are accurate for a set of click points may not be accurate if a click point is lost. To ensure convergence of the contour, the techniques described herein allow the user to define segments of the contour as being accurate using two or more click points. The click points defining a segment are referred to herein as "structured" click points. Once the structured click points are supplied by the user, these segments are then "fixed" and, as additional click points are added, the fixed segments remain unchanged while the contour inference algorithm is applied to the rest of the contour. In this way, the overall accuracy of the algorithm can be enhanced with constraints defined by the user.

Figure 1:
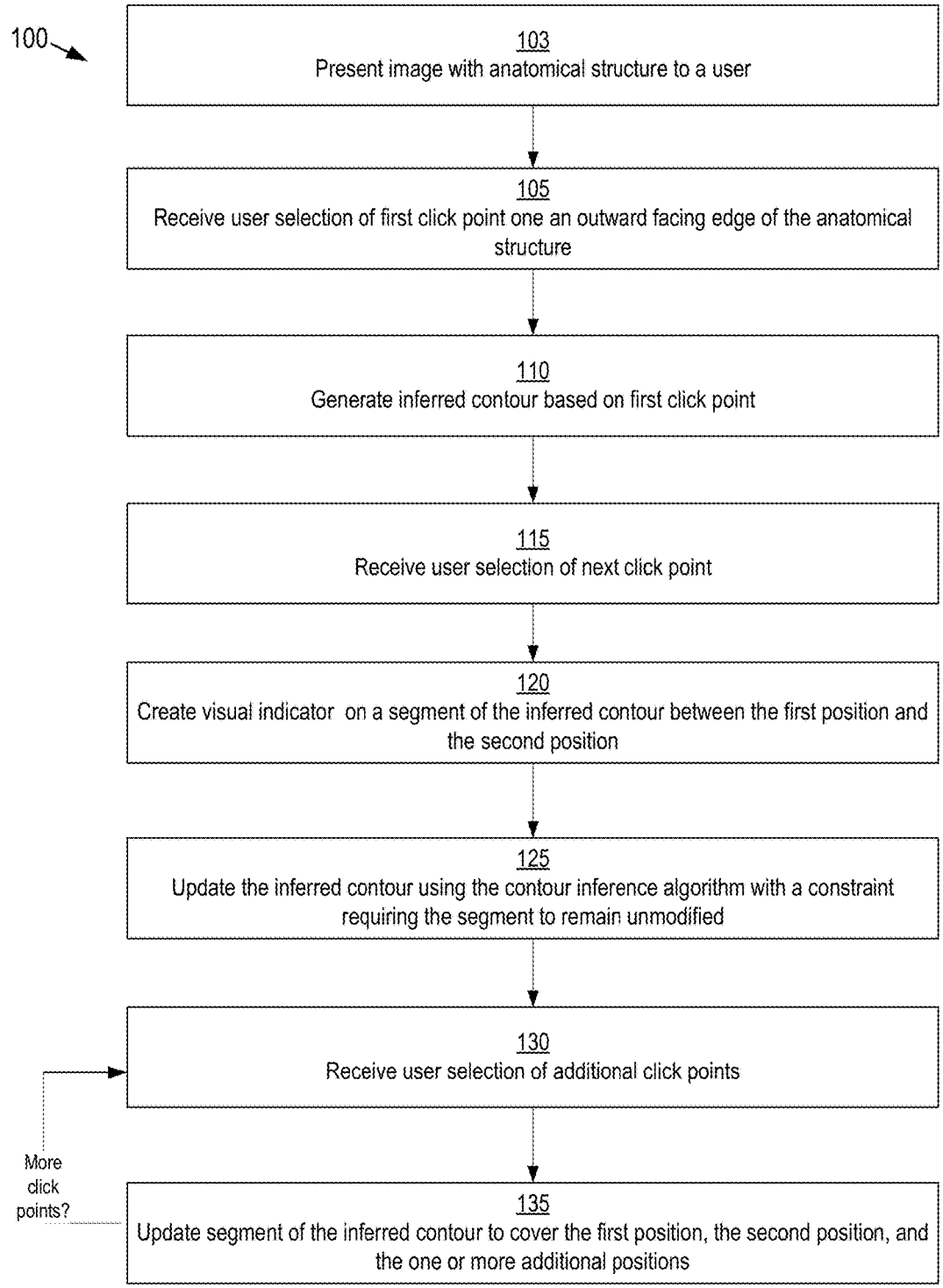
FIG. 1 illustrates a method for generating contours of anatomy based on user click points, according to some embodiments.
Figure 2A:
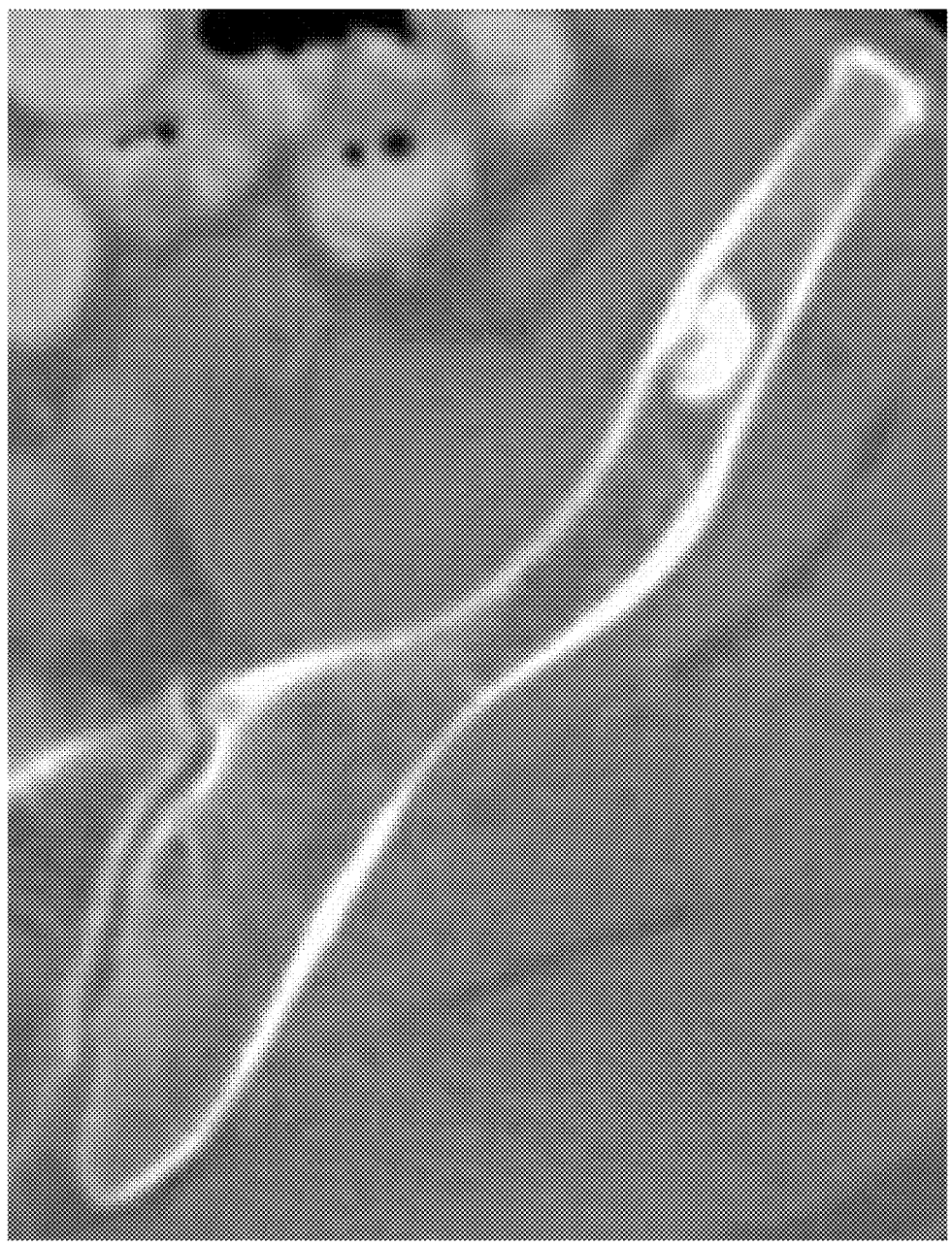
FIG. 2A provides an example of an image with an anatomical structure.

FIG. 1 illustrates a method 100 for generating contours of anatomy based on user click points, according to some embodiments. Starting at step 103 an image comprising an anatomical structure is presented to a user in a graphical user interface (GUI). In general, any type of display may be used for presenting the image. For example, in embodiments where the method 100 is implemented on a desktop computer, the display may be the computer's monitor. Similarly, where the method 100 is implemented on a mobile device, the display may be the device's touchscreen. It should be noted that the method 100 may be implemented either locally or over a network (e.g., in a cloud based environment). For a network-based implementation, step 103 may be implemented, for example, using an interactive webpage or a streamed interactive application. FIG. 2A provides an example of an image with an anatomical structure. In the description that follows, this example will be used to explain additional details of the present invention.

Continuing with reference to FIG. 1, step 105, the user selects a first click point at a first position on an outward facing edge of the anatomical structure. This user selection is then provided to the computer. In some embodiments, the "click point" is created by the user literally clicking a mouse or similar device when a pointer is located at a desired position. In other embodiments, the "click point" may be provided by other techniques more specific to the computing environment. For example, where the method is implemented with a touchscreen computing system that lacks a mouse, the user may provide "click points" by touching the screen at the desired location.

Figure 2B:
FIG. 2B provides an example of an inferred contour around the anatomical structure shown in FIG. 2A.
Figure 2C:
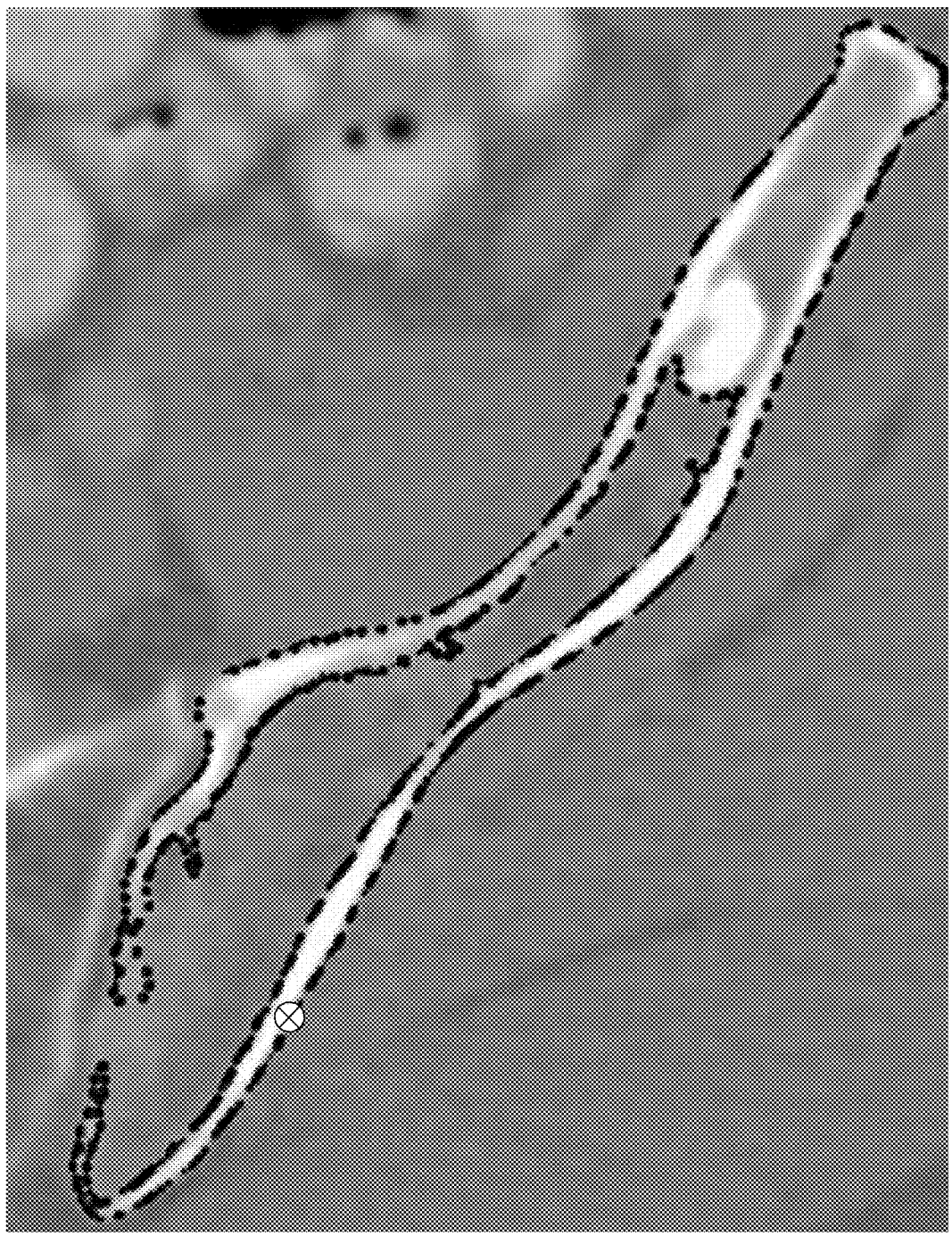
FIG. 2C provides an example of an inferred contour around the anatomical structure shown in FIG. 2A.

At step 110, a contour inference algorithm is applied to generate an inferred contour around the outward facing edge based on the first position. Various contour inference algorithms generally known in the art may be applied at step 110. One example of a contour inference algorithm is described in the article "Bilateral Hermite Radial Basis Functions for Contour-based Volume Segmentation." Computer Graphics Forum, 32(2pt1), 123-132. doi:10.1111/cgf.12032. FIGS. 2B and 2C show two possible inferred contours that may be generated around the anatomical structure shown in FIG. 2A. The click point in each figure is shown as a white circle with an "x" through the middle. In other embodiments, the click point(s) may be visualized differently when presented to the user. The inferred contour in these figures is shown as a broken, thick black line.

In some embodiments, the inferred contour is generated while the user is clicking the click point (or touching in the case of a touchscreen implementation). That is, the contour inference algorithm executes when the button is depressed by the user. If the user moves the click point while the button is depressed, the inferred contour can be updated in real time by re-executing the algorithm with the new position of the click point.

Following generation of the inferred contour, at step 115, the user provides second click point at a second position on the image. Then, this second user selection is provided to the computer. If the second position is not on the inferred contour, an alert may be provided to the user that the second position is not on the inferred contour. For example, a visual alert such as a pop up may be presented to the user. Alternatively, the visual alert may be more subtle. For example, in one embodiment, the pointer is presented on the display in one color (e.g., white) when positioned over the inferred contour, and the pointer is presented in another color (e.g., red) when positioned outside of the inferred contour. Once the user releases the second click point, at step 120, a visual indicator is created on a segment of the inferred contour between the first position and the second position. This visual indication is intended to be indicative of the user's confirmation of accuracy of the segment.

Figure 3A:
FIG. 3A provides an example of an inferred contour around the anatomical structure shown in FIG. 2A with a user-defined segment indicating correctness of a portion of the contour.
Figure 3B:
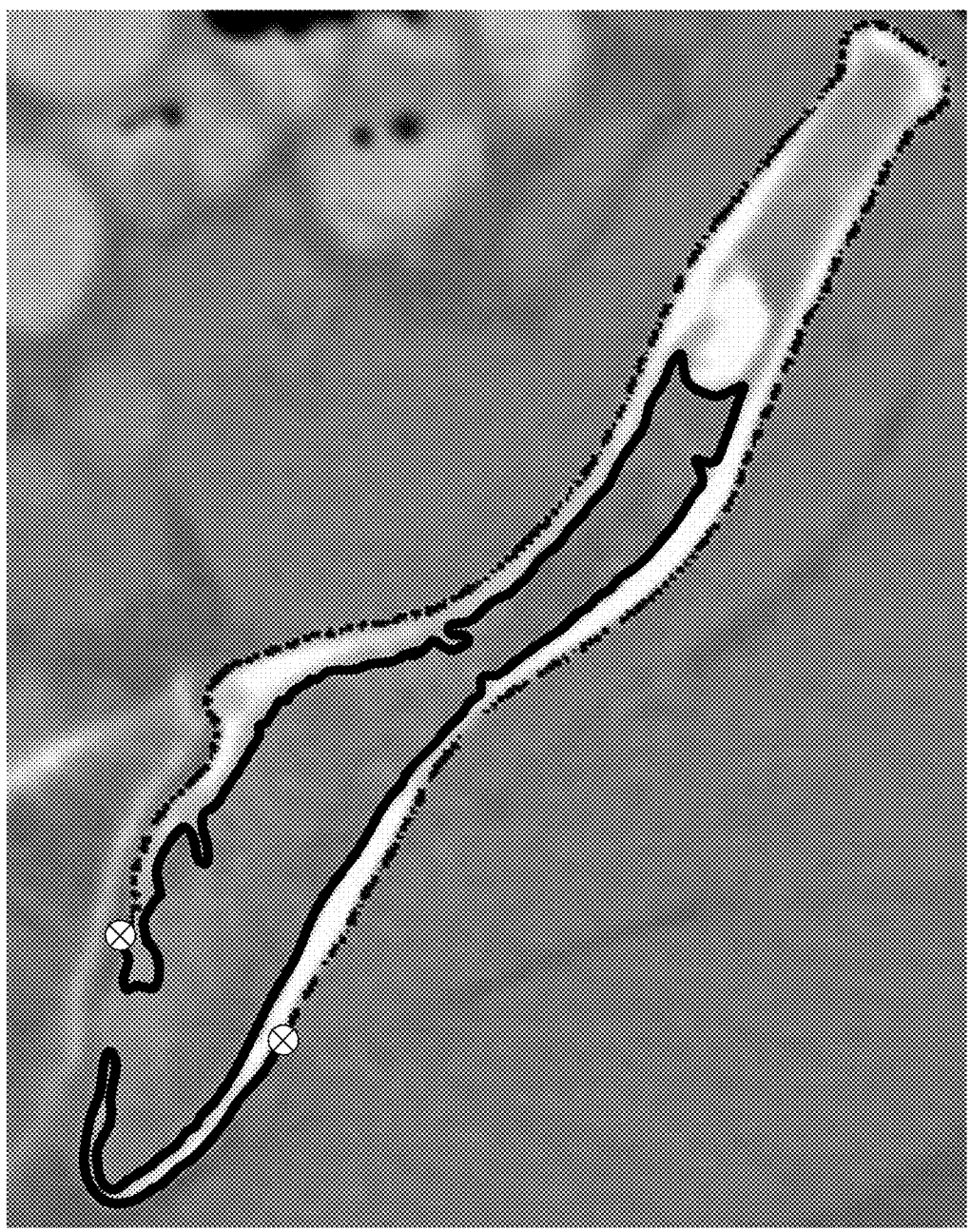
FIG. 3B provides an example of an inferred contour around the anatomical structure shown in FIG. 2A with a user-defined segment indicating correctness of a portion of the contour.

FIGS. 3A and 3B illustrate how an image may be modified following step 120. The inferred contour is still shown as a broken, thick black line, but here a segment is defined by two click points. This segment is shown in an unbroken, thick block line. Note that two click points in this example could define two different segments one around the top portion of the anatomical structure (as shown in FIG. 3A) and around the inner portion of the structure (as shown in FIG. 3B). To support this functionality, the user interface may provide the user with a way of alternating between the two options. For example, in one embodiment, the user may switch between the options while the second point is being depressed by performing a tab-switch (i.e., pressing tab on the user's keyboard). It should be noted that, although FIGS. 3A and 3B show the visual indicator as a solid black line, the techniques described herein are not limited as such. In other embodiments, the inferred contour and the user-defined segment may be presented in different colors.

Returning to FIG. 1, at step 125, the inferred contour is updated using contour inference algorithm with a constraint requiring the segment to remain unmodified. As noted above, conventional contour inference algorithms may be used in generating the inferred contour. Where such algorithms allow constraints to be supplied by the user, the segment defined at step 120 may be used directly. However, if the algorithm does not permit constraints to be explicitly added, the constraint may be artificially added based on the operating characteristics of the algorithm. For example, consider an intensity-based algorithm that generates an inferred contour based on intensity values. Given, the image in FIG. 2A, it may use the intensity value of the click point and using a neighbor-based algorithm to find contiguous pixels with the same or similar intensity values compared to the click point. In this situation, a constraint may be applied by changing the intensity values of a region of the anatomical structure surrounding the segment. For example, if the click point has a high intensity value (presenting as white), the input to the algorithm may artificially lower the intensity of the region of the anatomical structure around the segment such that the region would be considered separate from the anatomical structure.

At step 130, the user selects one or more additional click points at one or more additional positions on the image. Then, at step 135, the visual indicator is updated again to cover a new segment of the inferred contour comprising the first position, the second position, and the one or more additional positions. This visual indication is intended to be indicative of the user's confirmation of accuracy of the new segment.

Figure 4A:
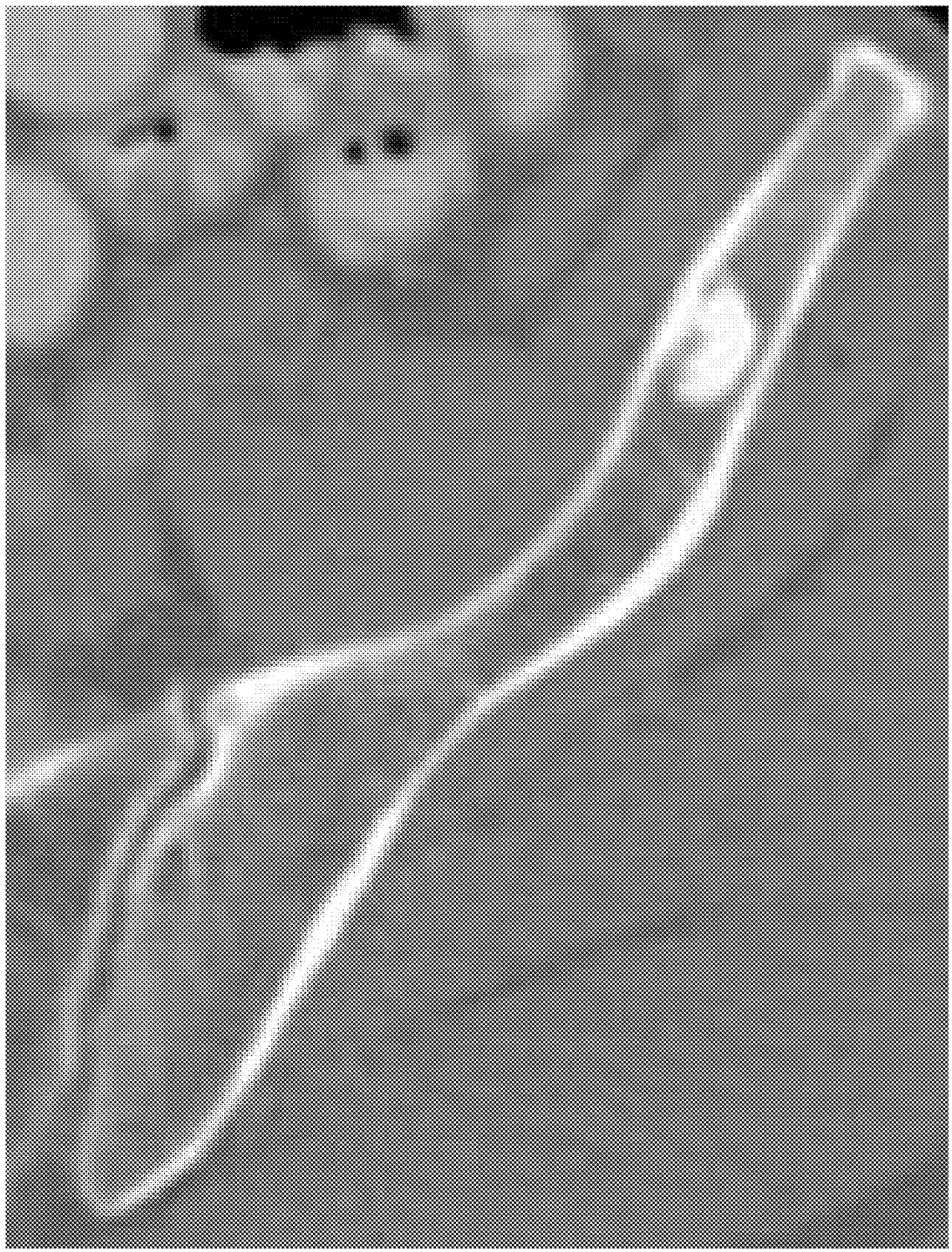
FIG. 4A shows an image of a bone.
Figure 4B:
FIG. 4B shows a contour inferred around the bone shown in FIG. 4A based on 1 user click point.
Figure 4C:
FIG. 4C shows a contour inferred around the bone shown in FIG. 4A based on 2 user click point.
Figure 4D:
FIG. 4D shows a contour inferred around the bone shown in FIG. 4A based on 3 user click point.
Figure 4E:
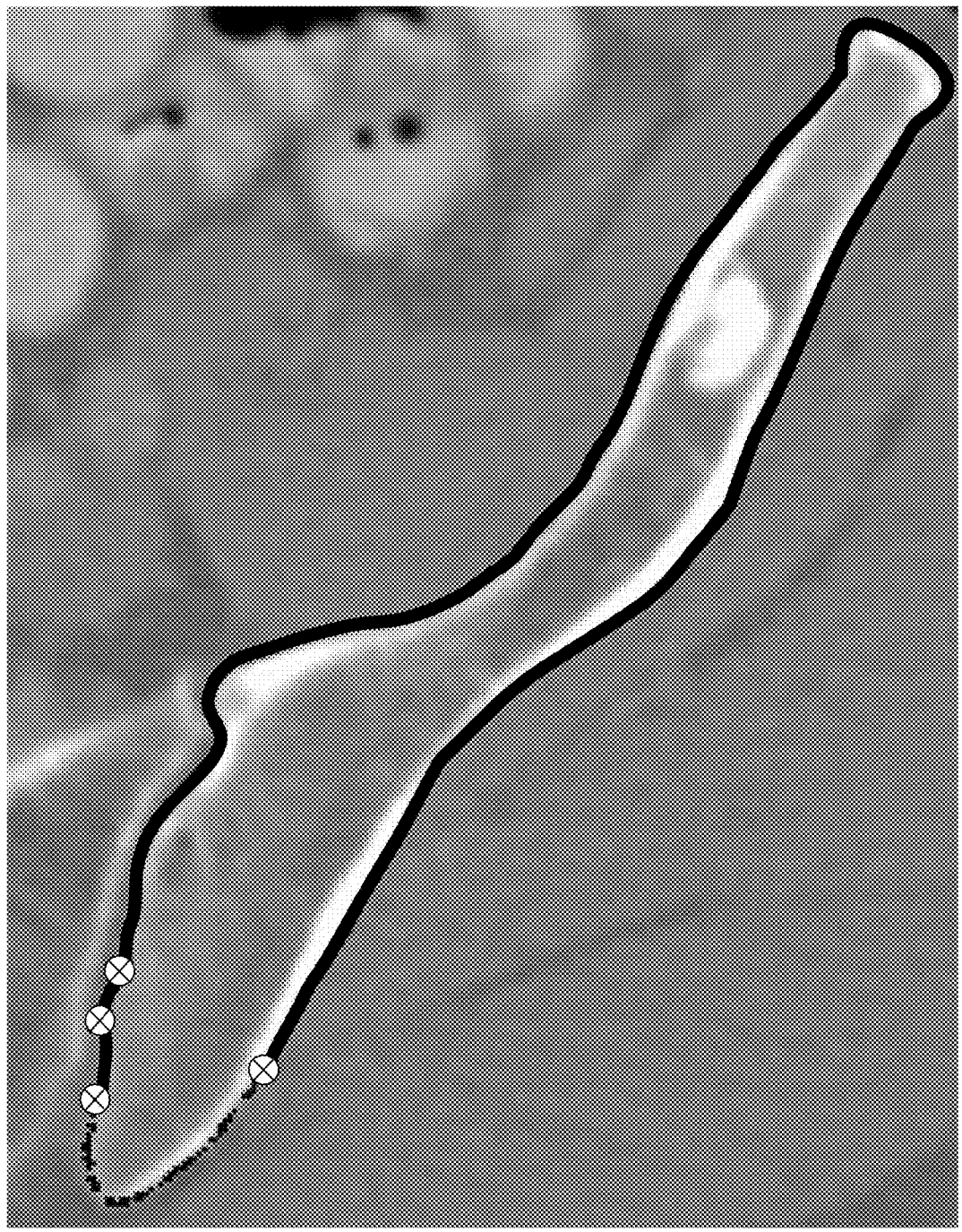
FIG. 4E shows a contour inferred around the bone shown in FIG. 4A based on 4 user click point.
Figure 4F:
FIG. 4F shows a contour inferred around the bone shown in FIG. 4A based on number of click points sufficient to show results comparable to manual clicking.
Figure 4G:
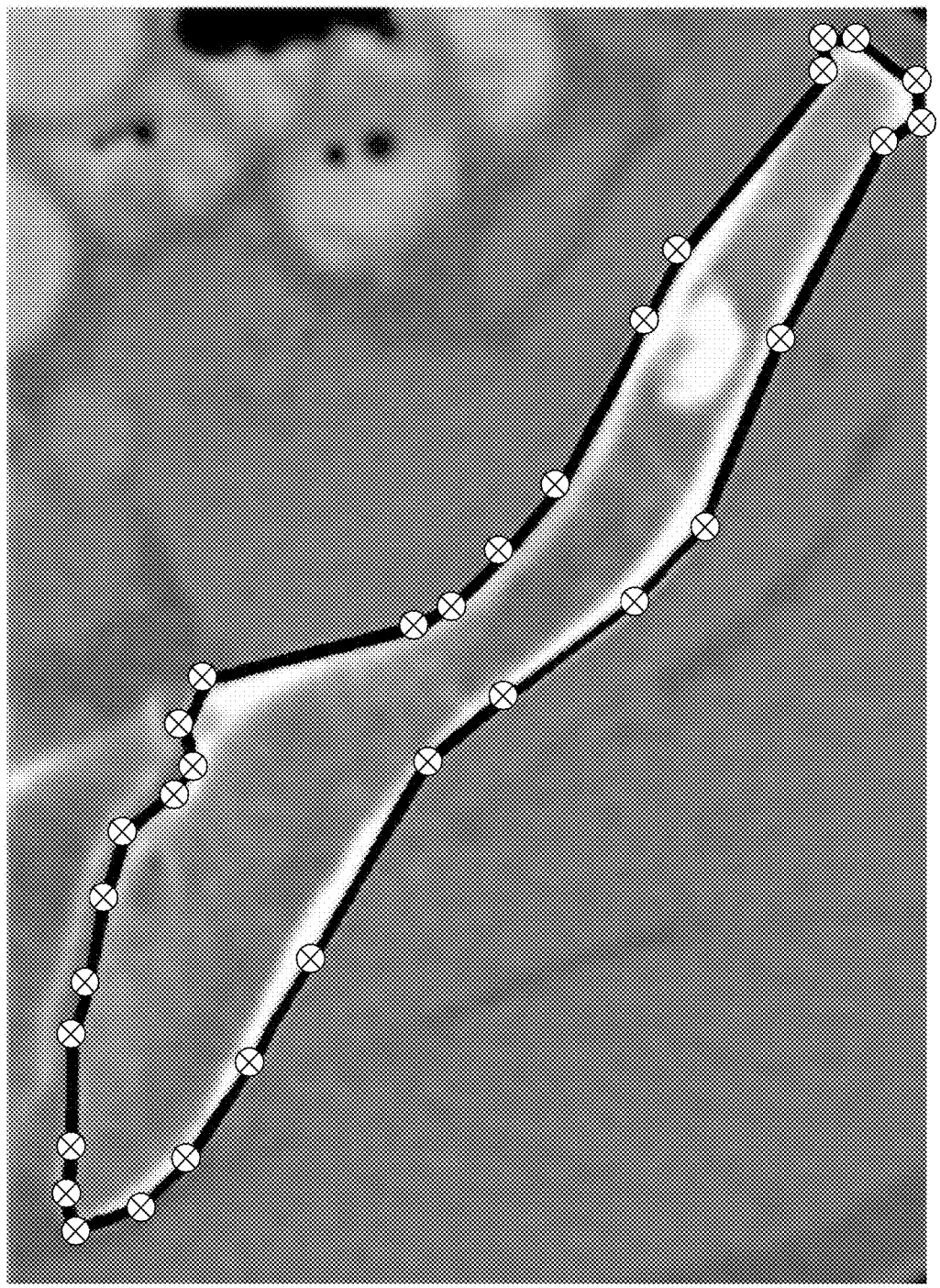
FIG. 4G shows a contour inferred around the bone shown in FIG. 4A created based on manual clicking.

FIGS. 4A-4G illustrate the contour inference techniques described herein, with various numbers of click points in comparison to a conventional manual editing technique. More specifically, FIG. A shows the original image where the anatomical structure is a bone. FIGS. B-E show the contour inferred with 1, 2, 3, and 4 points, respectively, and FIG. 4F shows the final contour using the techniques describe herein. For comparison, FIG. 4G shows the results produced by manual clicking of 32 points. As shown in these figures, with four click points, the user is able to contour the bone while a purely manual contouring takes as many as 32 points. These figures demonstrate that, when the image has good contrast, the inference algorithm does a good work; otherwise, the user input may be needed to pass through the vague area(s).

Figure 5:
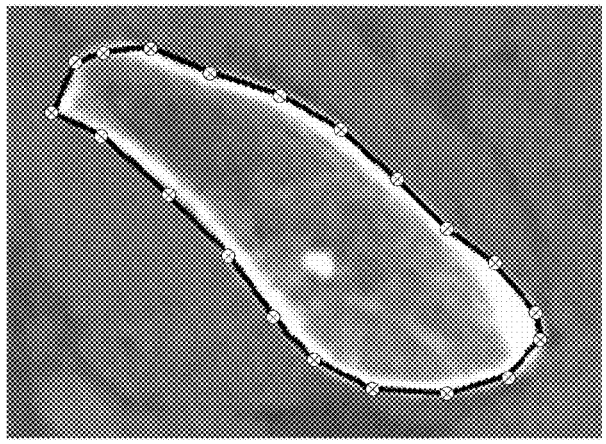
FIG. 5 compares the contour inference technique described herein and manual click techniques for a cortical bone anatomical object.
Figure 5:
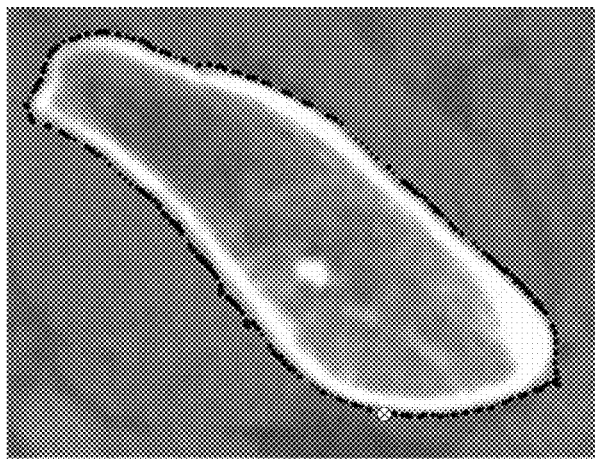
Figure 5:
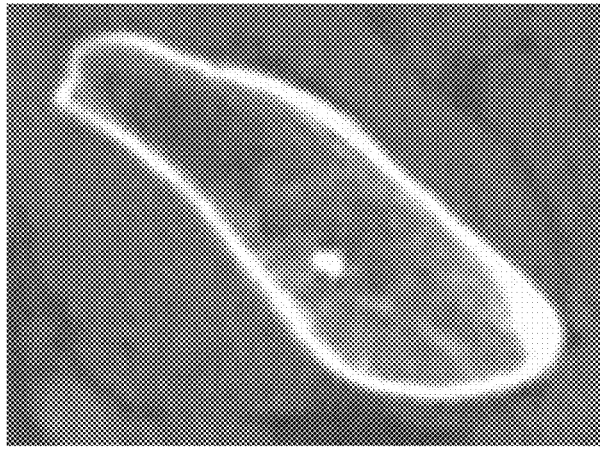

FIG. 5 compares the contour inference technique described herein and manual click techniques when editing objects with varying geometric complexities and different contrast levels. For a simple object with good image contrast like the cortical bone as shown in the leftmost image in FIG. 5, a single click may be sufficient as shown in the middle image. Manual clicking requires 19 points as shown in the rightmost image in FIG. 5.

Figure 6:
FIG. 6 compares the contour inference technique described herein and manual click techniques for a sacrum anatomical object.
Figure 6:
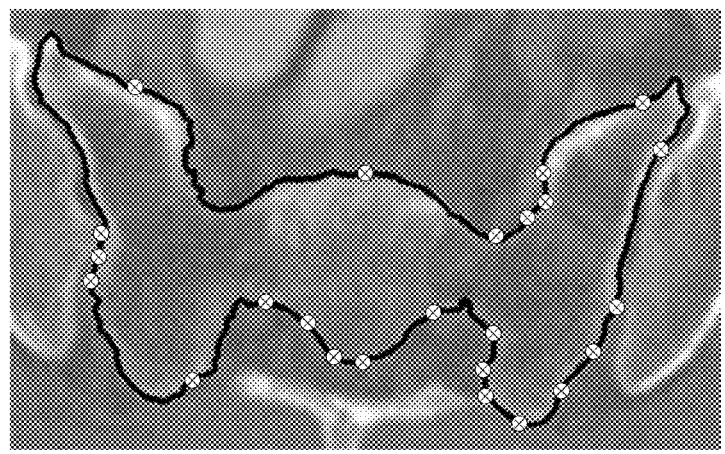
Figure 6:
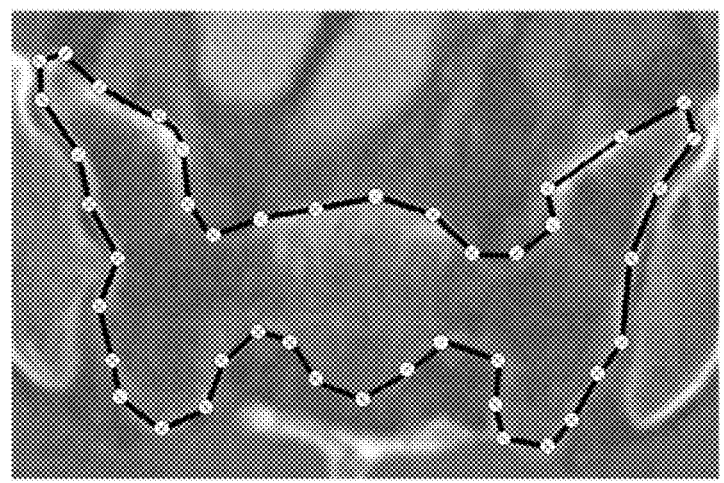

FIG. 6 shows a similar comparison for the sacrum. As shown in the top image, the sacrum is a more complex object than the cortical bone because it has varying image contrast. The contour inference technique described herein requires 24 click points to accurately map the sacrum (as shown in the middle image); conversely manual clicking requires 43 click points (as shown in the bottom image).

Figure 7:
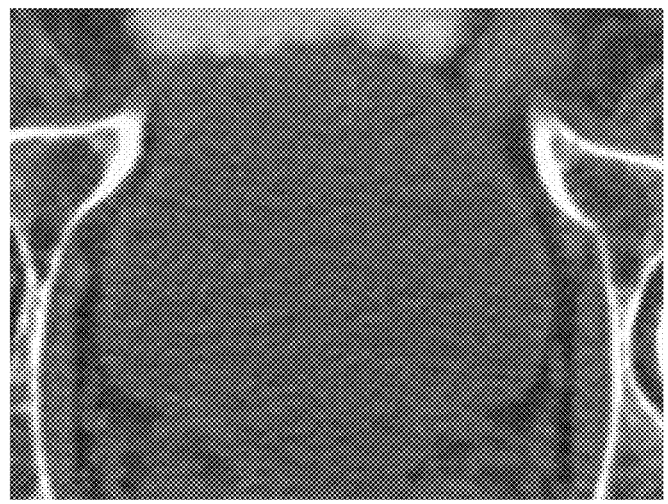
FIG. 7 compares the contour inference technique described herein and manual click techniques for a bladder anatomical object.
Figure 7:
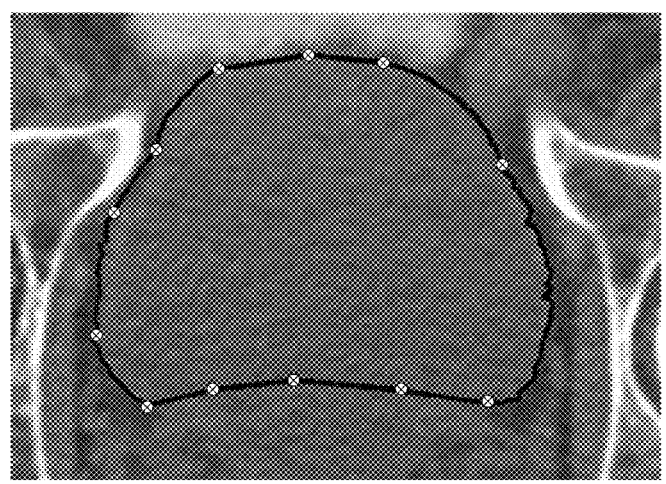
Figure 7:
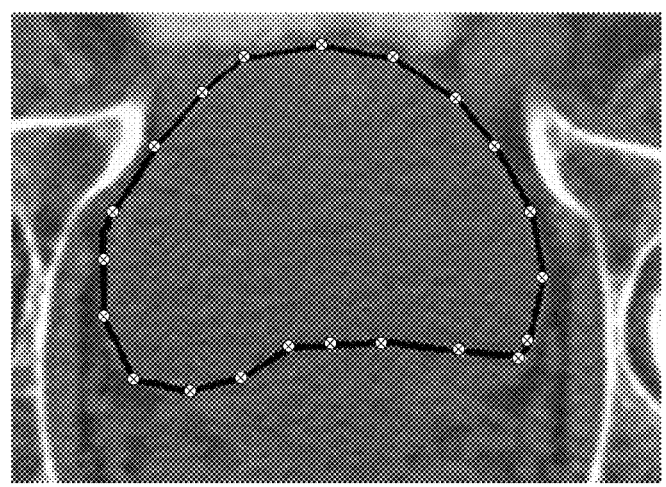

FIG. 7 shows a comparison of contour inference and manual clicking for a bladder. The original image, shown at the top of FIG. 7 shows that the bladder has extremely weak contrast in comparison to the anatomical objects shown in the FIGS. 5 and 6. However, even in this instance, contour inference only requires 12 click points in comparison to 21 click points required for manual contour identification.

FIGS. 8A-8D show an example of contour leakage using the contour inference techniques described herein. Briefly, the leakage is fixed by clicking the starting and ending points that contains the leakage. Click points can then be added in between to fix the leakage. In some embodiments, the leakage is detected manually by the user while visually inspecting the image and the proposed contour. In other embodiments, a machine learning model trained on a large number of images and contours may be used to automatically identify leakages. Where automatic identification is used, the identified leakages may be specified for the user so that each leakage can be corrected or ignored by the user. In some embodiments, the machine learning may be further trained to propose corrections for each leakage, which can then be used by the user (either directly or with modification).

Figure 8A:
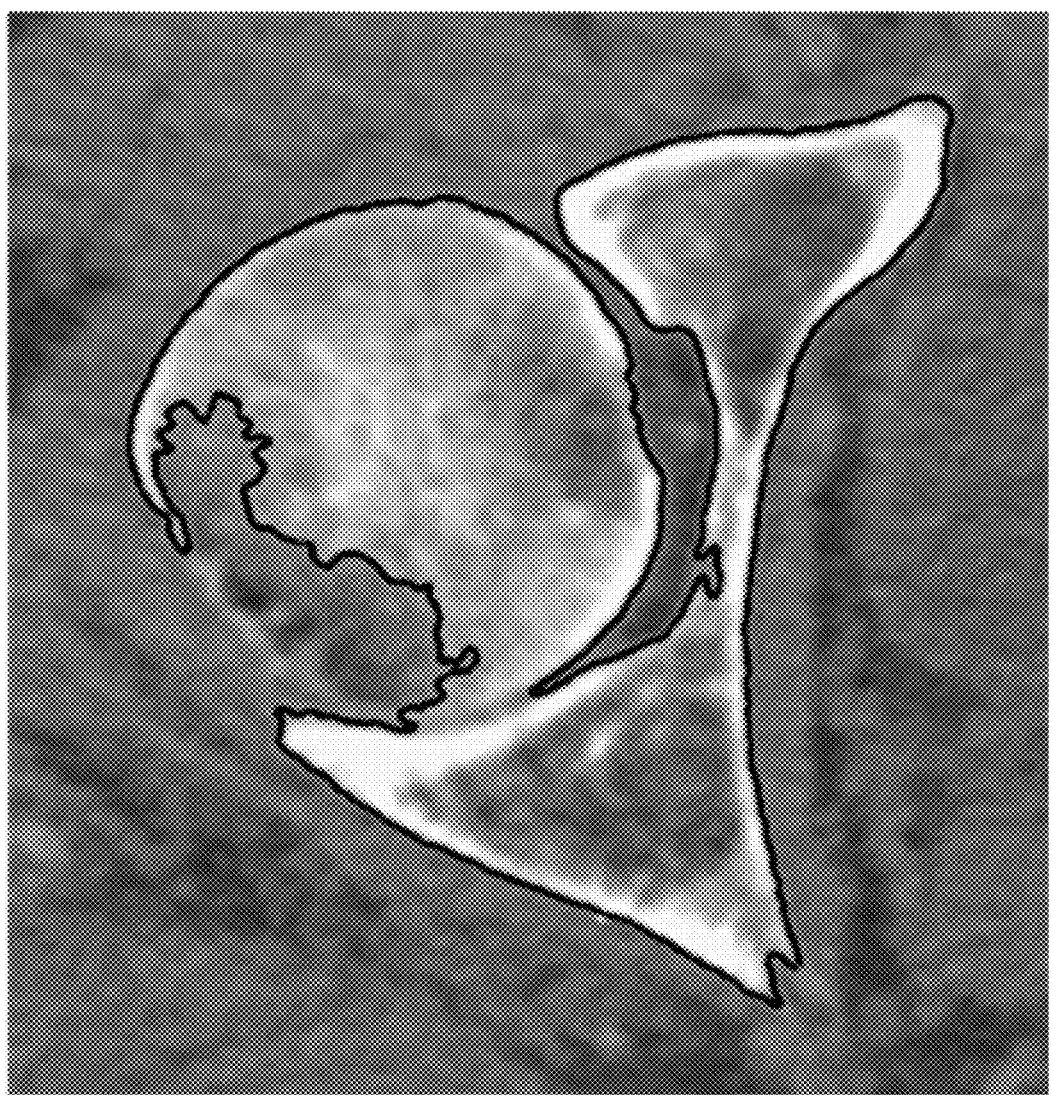
FIG. 8A shows an image of a plurality of anatomical objects and an inferred contour showing leakages.
Figure 8B:
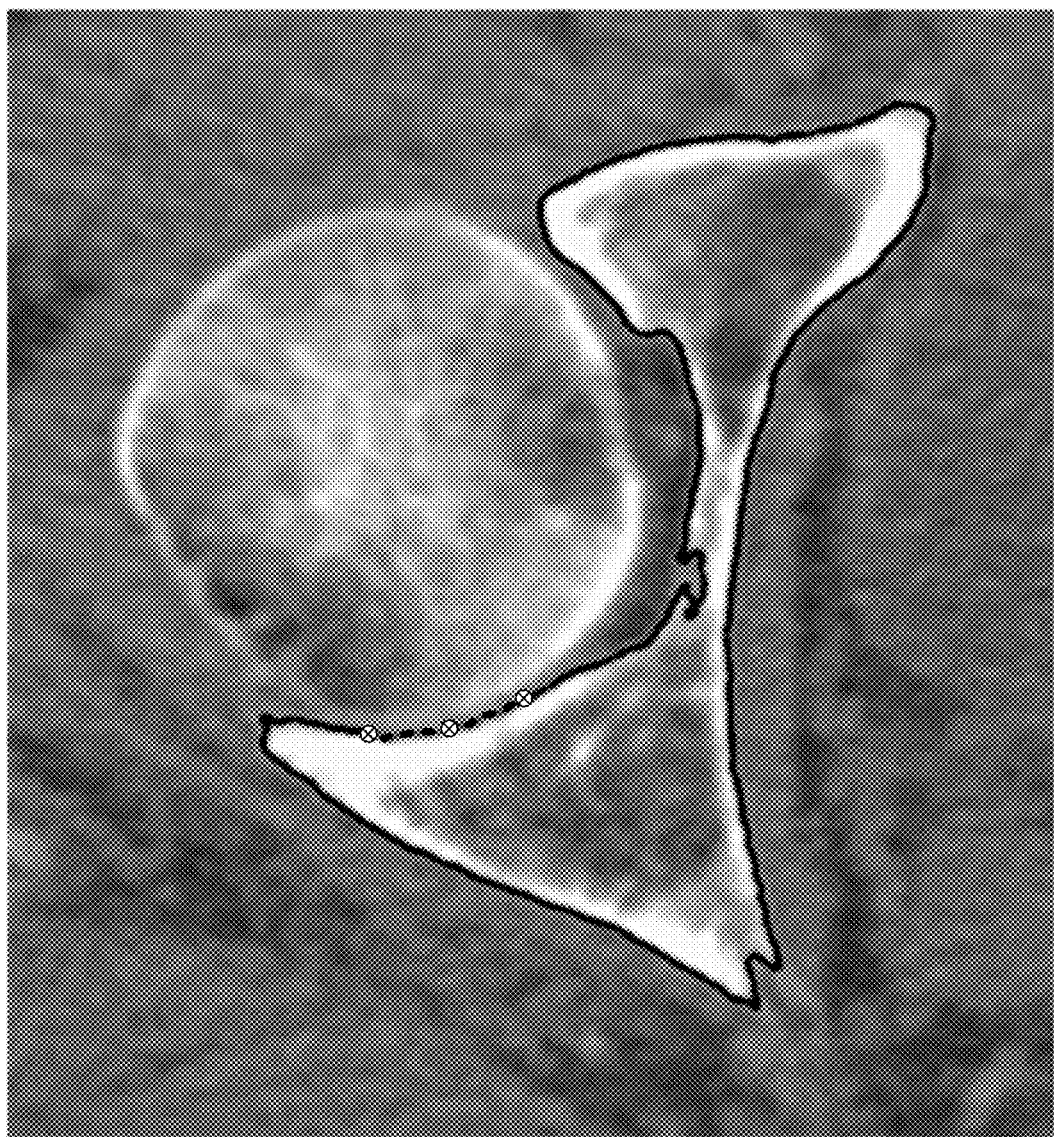
FIG. 8B shows a first correction of a leakage in the image shown in FIG. 8A.
Figure 8C:
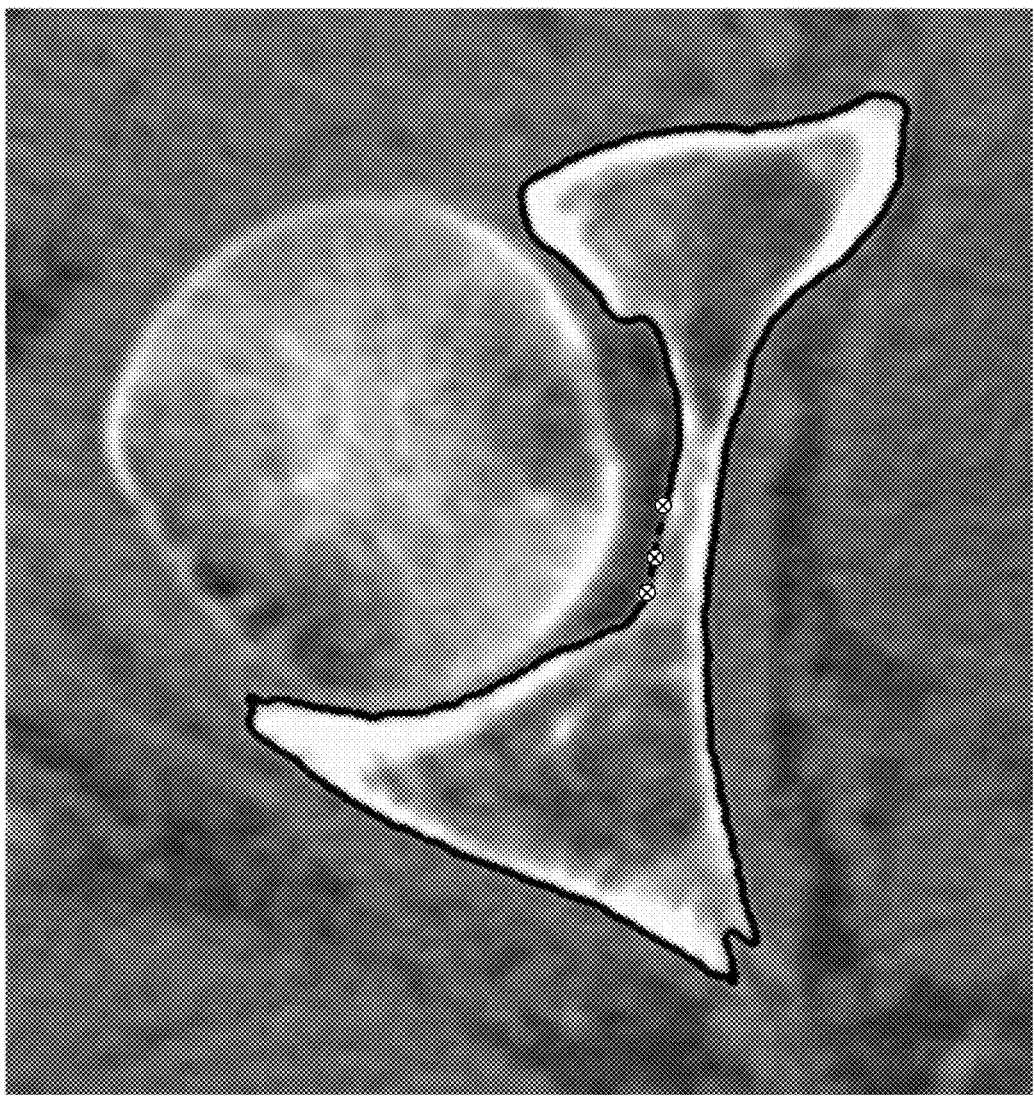
FIG. 8C shows a second correction of a leakage in the image shown in FIG. 8A.
Figure 8D:
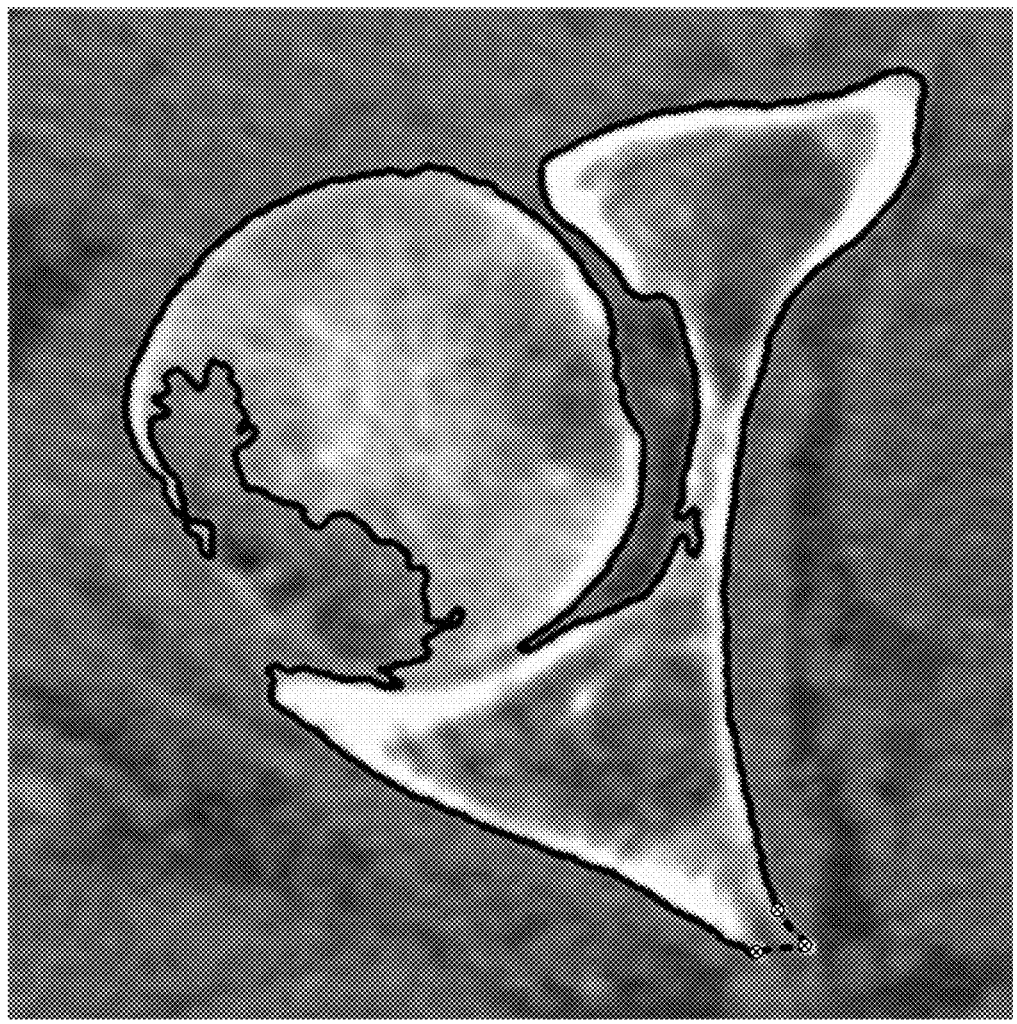
FIG. 8D shows a third correction of a leakage in the image shown in FIG. 8A.

FIG. 8A shows the original image after a contour inference algorithm is executed. Here, due to contour leakage two anatomical objects are being covered by a single contour. In FIG. 8B, the user adds three click points to create a segment (shown with a dotted line) to correct a particular leakage between the two objects. In FIG. 8C, following the correction in FIG. 8B, a portion of the second object showing leakage is corrected (again shown with a dotted line). FIG. 8D shows a more substantial correction of a leakage in the lower right-hand corner of the right object.

Figure 9:
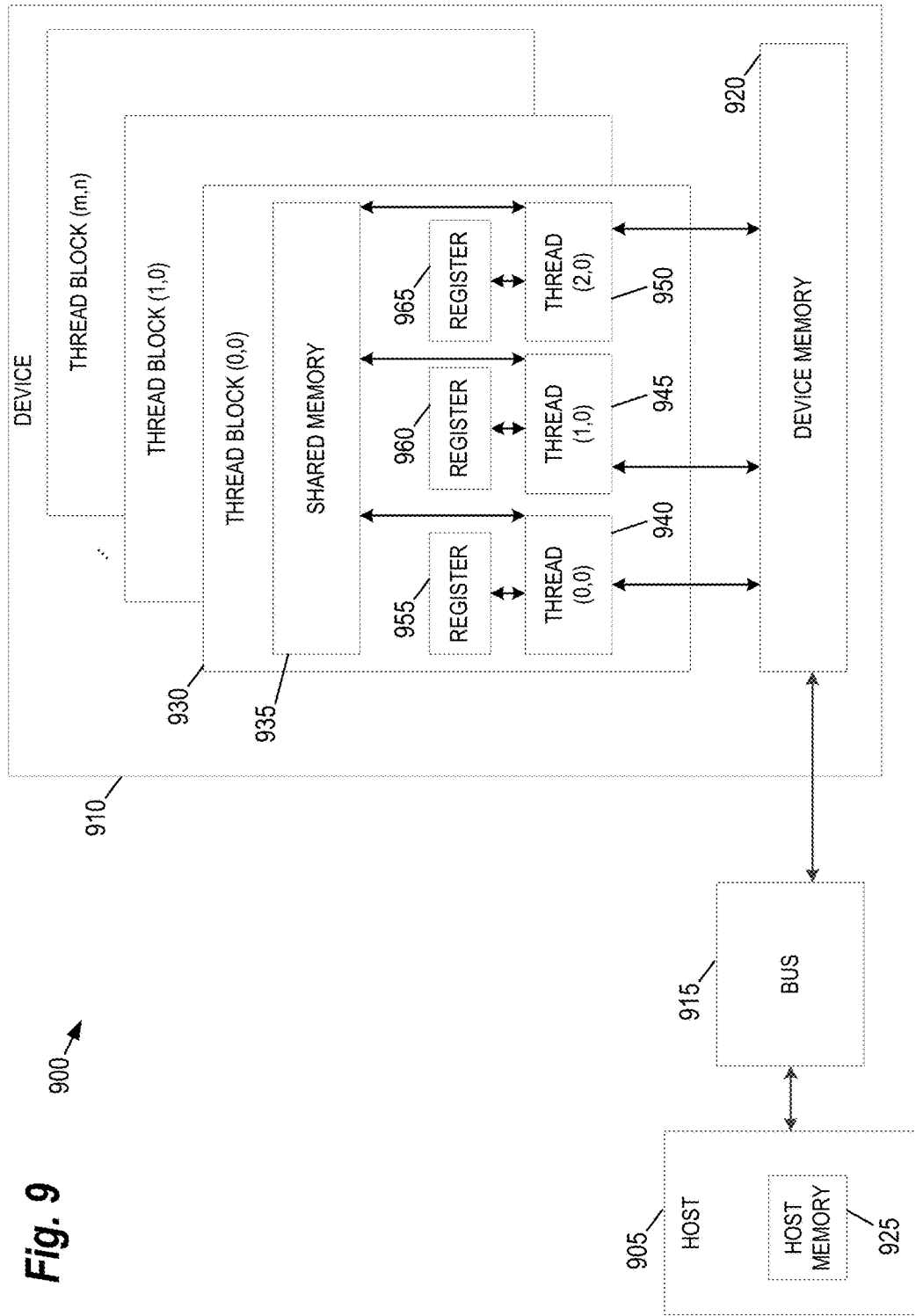
FIG. 9 provides an example of a parallel processing memory platform that may be utilized to implement the machine learning models and other aspects of the contour inference techniques discussed herein

One advantage of the contour inference techniques described herein are its computation time. In general, the techniques have a moderate requirement on the computational resource and may be implemented using various computing platforms generally known in the art (e.g., a server computer, desktop computer, etc.). Additionally, the contour inference techniques are readily applicable to 2D or 3D images. For the latter, it may be advantageous to implement portions of the contour inference techniques on a parallel processing architecture. FIG. 9 provides an example of a parallel processing memory platform 900 that may be utilized to implement the machine learning models and other aspects of the contour inference techniques discussed herein. Leveraging the computational power of such a platform, contours may be defined for images of various complexity and definition. Moreover, this computational power would also allow contour inference to be performed on video images by repeatedly executing the contour inference algorithm on each frame of the video.

The example platform 900 shown in FIG. 9 may be used in embodiments of the present invention where NVIDIA CUDA™ (or a similar parallel computing platform) is used. The architecture includes a host computing unit ("host") 905 and a graphics processing unit (GPU) device ("device") 910 connected via a bus 915 (e.g., a PCIe bus). The host 905 includes the central processing unit, or "CPU" (not shown in FIG. 9), and host memory 925 accessible to the CPU. The device 910 includes the graphics processing unit (GPU) and its associated memory 920, referred to herein as device memory. The device memory 920 may include various types of memory, each optimized for different memory usages. For example, in some embodiments, the device memory includes global memory, constant memory, and texture memory.

Parallel portions of a big data platform and/or big simulation platform (see FIG. 9) may be executed on the platform 900 as "device kernels" or simply "kernels." A kernel comprises parameterized code configured to perform a particular function. The parallel computing platform is configured to execute these kernels in an optimal manner across the platform 900 based on parameters, settings, and other selections provided by the user. Additionally, in some embodiments, the parallel computing platform may include additional functionality to allow for automatic processing of kernels in an optimal manner with minimal input provided by the user.

The processing required for each kernel is performed by grid of thread blocks (described in greater detail below). Using concurrent kernel execution, streams, and synchronization with lightweight events, the platform 900 of FIG. 9 (or similar architectures) may be used to parallelize portions of the machine model-based operations performed in training or executing the contour inference algorithms discussed herein. Additionally, concurrent execution may be utilized for tracking segment positioning from frame to frame during contour inference on video images.

The device 910 includes one or more thread blocks 930 which represent the computation unit of the device 910. The term thread block refers to a group of threads that can cooperate via shared memory and synchronize their execution to coordinate memory accesses. For example, in FIG. 9, threads 940, 945 and 950 operate in thread block 930 and access shared memory 935. Depending on the parallel computing platform used, thread blocks may be organized in a grid structure. A computation or series of computations may then be mapped onto this grid. For example, in embodiments utilizing CUDA, computations may be mapped on one-, two-, or three-dimensional grids. Each grid contains multiple thread blocks, and each thread block contains multiple threads. For example, in FIG. 9, the thread blocks 930 are organized in a two dimensional grid structure with m+1 rows and n+1 columns. Generally, threads in different thread blocks of the same grid cannot communicate or synchronize with each other. However, thread blocks in the same grid can run on the same multiprocessor within the GPU at the same time. The number of threads in each thread block may be limited by hardware or software constraints.

Continuing with reference to FIG. 9, registers 955, 960, and 965 represent the fast memory available to thread block 930. Each register is only accessible by a single thread. Thus, for example, register 955 may only be accessed by thread 940. Conversely, shared memory is allocated per thread block, so all threads in the block have access to the same shared memory. Thus, shared memory 935 is designed to be accessed, in parallel, by each thread 940, 945, and 950 in thread block 930. Threads can access data in shared memory 935 loaded from device memory 920 by other threads within the same thread block (e.g., thread block 930). The device memory 920 is accessed by all blocks of the grid and may be implemented using, for example, Dynamic Random-Access Memory (DRAM).

Each thread can have one or more levels of memory access. For example, in the platform 900 of FIG. 9, each thread may have three levels of memory access. First, each thread 940, 945, 950, can read and write to its corresponding registers 955, 960, and 965. Registers provide the fastest memory access to threads because there are no synchronization issues and the register is generally located close to a multiprocessor executing the thread. Second, each thread 940, 945, 950 in thread block 930, may read and write data to the shared memory 935 corresponding to that block 930. Generally, the time required for a thread to access shared memory exceeds that of register access due to the need to synchronize access among all the threads in the thread block. However, like the registers in the thread block, the shared memory is typically located close to the multiprocessor executing the threads. The third level of memory access allows all threads on the device 910 to read and/or write to the device memory. Device memory requires the longest time to access because access must be synchronized across the thread blocks operating on the device. Thus, in some embodiments, an image can be divided into sections using data locality techniques generally known in the art. Then, each section of the image can be processed in parallel using register memory, with shared and device memory only being used as necessary to combine the results to provide the results for the final dataset.

The embodiments of the present disclosure may be implemented with any combination of hardware and software. For example, aside from parallel processing architecture presented in FIG. 9, standard computing platforms (e.g., servers, desktop computer, etc.) may be specially configured to perform the techniques discussed herein. In addition, the embodiments of the present disclosure may be included in an article of manufacture (e.g., one or more computer program products) having, for example, computer-readable, non-transitory media. The media may have embodied therein computer readable program code for providing and facilitating the mechanisms of the embodiments of the present disclosure. The article of manufacture can be included as part of a computer system or sold separately.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

The invention claimed is:

1. A computer-implemented method for generating contours of anatomy based on user click points, the method comprising:
    displaying, by a computer, an image comprising an anatomical structure;
    receiving, by the computer, a first user selection of a first click point at a first position on an outward facing edge of the anatomical structure;
    applying, by the computer, a contour inference algorithm to generate an inferred contour around the outward facing edge based on the first position;
    following generation of the inferred contour, receiving a second user selection of a second click point at a second position on the inferred contour;
    creating a visual indicator on a segment of the inferred contour between the first position and the second position as indicative of the user's confirmation of accuracy of the segment; and
    updating the inferred contour using the contour inference algorithm with a constraint requiring the segment to remain unmodified.

2. The method of claim 1, wherein the first user selection is provided by a user depressing a button of an input device of the computer and the inferred contour is generated while the button is depressed by the user.

3. The method of claim 2, further comprising:
    while the button is depressed by the user, detecting movement of the first click point from the first position by the user and updating the inferred contour around the outward facing edge based on an updated position of the first click point.

4. The method of claim 1, further comprising:
    following creation of the visual indicator, receiving one or more additional user selections of one or more additional click points at one or more additional positions on the image;
    updating the visual indicator to cover a new segment of the inferred contour comprising the first position, the second position, and the one or more additional positions as indicative of the user's confirmation of accuracy of the new segment.

5. The method of claim 1, wherein the second user selection is provided by a user depressing a button of an input device of the computer and the visual indicator is generated after the button is released by the user.

6. The method of claim 1, further comprising:
    determining that the second position is not on the inferred contour; and
    providing a visual alert to the user that the second position is not on the inferred contour.

7. The method of claim 6, wherein the second user selection is provided by a user depressing a button of an input device of the computer and the method further comprises:
    while the button is depressed by the user, detecting movement of the second click point from the second position by the user to an updated position;
    determining that the updated position is on the inferred contour; and updating the visual indicator to cover the segment of the inferred contour between the first position and the updated position.

8. A computer-implemented method for generating contours of anatomy based on user click points, the method comprising:
  displaying, by a computer, an image comprising an anatomical structure;
  receiving, by the computer, a first user selection of a first click point at a first position on an outward facing edge of the anatomical structure;
  applying, by the computer, a contour inference algorithm to generate an inferred contour around the outward facing edge based on the first position;
  identifying one or more leakages in the inferred contour; and
  receiving, by the computer, additional user selections of additional click points at positions corresponding to the one or more leakages;
  creating, by the computer, visual indicators on segments of the inferred contour defined based on the additional click points; and
  updating the inferred contour using the contour inference algorithm with a constraint requiring the segments to remain unmodified.

9. The method of claim 8, wherein the first user selection is provided by a user depressing a button of an input device of the computer and the inferred contour is generated while the button is depressed by the user.

10. The method of claim 9, further comprising:
  while the button is depressed by the user, detecting movement of the first click point from the first position by the user and updating the inferred contour around the outward facing edge based on an updated position of the first click point.

11. The method of claim 8, further comprising:
  following creation of the visual indicators, receiving one or more additional user selections of one or more additional click points at one or more new positions on the image; and
  updating the visual indicators to cover new segments of the inferred contour comprising the additional positions and the new positions.

12. The method of claim 8, wherein the additional user selections are provided by a user depressing a button of an input device of the computer and visual indicators are generated after the button is released by the user.

13. The method of claim 8, wherein the one or more leakages in the inferred contour are identified using a machine learning model trained using (a) a plurality of previously generated images of the anatomical structure and (b) a plurality of inferred contours generated by applying the contour inference algorithm to the plurality of previously generated images.

14. An article of manufacture for generating contours of anatomy based on user click points, the article of manufacture comprising a non-transitory, tangible computer-readable medium holding computer-executable instructions for performing a method comprising:
  generating a graphical user interface (GUI) displaying an image comprising an anatomical structure;
  receiving a first user selection of a first click point at a first position on an outward facing edge of the anatomical structure;
  applying a contour inference algorithm to generate an inferred contour around the outward facing edge based on the first position;
  following generation of the inferred contour, receiving a second user selection of a second click point at a second position on the image;
  creating a visual indicator in the GUI on a segment of the inferred contour between the first position and the second position as indicative of the user's confirmation of accuracy of the segment; and
  updating the inferred contour using the contour inference algorithm with a constraint requiring the segment to remain unmodified.

* * * * *